ð USOO9718438B2

(12) United States Patent
Odate (10) Patent No.: US 9,718,438 B2
(45) Date of Patent: Aug. 1, 2017

(54) SEAT BELT DEVICE (75) Inventor: Shotaro Odate, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/126,592

(22) PCT Filed: Jun. 18, 2012

(86) PCT No.: PCT/JP2012/065538
§ 371 (c)(1),
(2), (4) Date: Dec. 16, 2013

(87) PCT Pub. No.: WO2013/027478
PCT Pub. Date: Feb. 28, 2013

(65) Prior Publication Data
US 2014/0117139 A1 May 1, 2014

(30) Foreign Application Priority Data
Aug. 24, 2011 (JP) .................................. 2011-182524

(51) Int. Cl.
B60R 22/44 (2006.01)
B60R 22/46 (2006.01)
(Continued)

(52) U.S. Cl.
CPC ............ B60R 22/46 (2013.01); B60R 22/023 (2013.01); B60R 22/44 (2013.01); B60R 22/48 (2013.01);
(Continued)

(58) Field of Classification Search
CPC ...... B60R 2022/4666; B60R 2022/444; B60R 2022/029; B60R 22/44; B60R 22/46; B60R 22/48
(Continued)

(56) References Cited

U.S. PATENT DOCUMENTS 6,848,717 B2 * 2/2005 Bullinger et al. ............ 280/806
7,517,025 B2 * 4/2009 Tanaka et al. ................ 297/477
(Continued)

FOREIGN PATENT DOCUMENTS

EP 2143597 A1 1/2010
JP 2001-334913 12/2001
(Continued)

OTHER PUBLICATIONS

European Search Report dated Nov. 25, 2014, 5 pages.
(Continued)

Primary Examiner — Sang Kim
(74) Attorney, Agent, or Firm — Rankin, Hill & Clark LLP (57) ABSTRACT A seat belt device includes a belt reel around which webbing is wound, a winding spring that rotationally biases the belt reel in a winding direction, a motor that is configured to transmit a driving force to the belt reel, a clutch that is interposed between the motor and the belt reel, and which performs connection/disconnection of the motor and the belt reel, a webbing speed detection unit that detects the winding speed of the webbing, a fastened/released state detection unit that detects a fastened state and a released state of the webbing, a basic winding control unit that drives the motor in the winding direction in a rotating manner and puts the clutch into a connected state, and a speed increase correction unit that increases the speed of the motor with respect to the speed of the motor obtained by the control of the basic winding control unit.

4 Claims, 6 Drawing Sheets (51) Int. Cl.
  *B60R 22/02* (2006.01)
  *B60R 22/48* (2006.01)
(52) U.S. Cl.
  CPC ... *B60R 2022/029* (2013.01); *B60R 2022/444* (2013.01); *B60R 2022/4666* (2013.01)
(58) Field of Classification Search
  USPC ............ 242/382.1, 382.4, 383, 390.1, 390.6, 242/390.9
  See application file for complete search history.

(56) References Cited

U.S. PATENT DOCUMENTS

| | | | |
|---|---|---|---|
| 7,726,693 B2* | 6/2010 | Koide ........................... | 280/807 |
| 7,775,473 B2* | 8/2010 | Mori ............................. | 242/374 |
| 7,823,679 B2* | 11/2010 | Takao et al. .................. | 180/268 |
| 8,091,821 B2* | 1/2012 | Burkart ................... | B60R 22/46 |
| | | | 242/374 |
| 8,579,066 B2* | 11/2013 | Odate et al. .................. | 180/268 |
| 2004/0021029 A1* | 2/2004 | Eberle et al. .............. | 242/390.9 |
| 2007/0095963 A1* | 5/2007 | Yukinori et al. ............. | 242/374 |
| 2008/0265551 A1* | 10/2008 | Odate ........................... | 280/733 |
| 2009/0079178 A1* | 3/2009 | Odate .................... | B60R 22/02 |
| | | | 280/807 |
| 2010/0007191 A1* | 1/2010 | Takao .................... | B60R 22/02 |
| | | | 297/475 |
| 2010/0117438 A1* | 5/2010 | Takao et al. .................. | 297/475 |
| 2010/0125392 A1* | 5/2010 | Takao et al. ................... | 701/45 |
| 2012/0098324 A1* | 4/2012 | Fouilleul ............... | B60R 21/013 |
| | | | 297/480 |
| 2012/0221210 A1* | 8/2012 | Adolfsson ............... | B60R 22/44 |
| | | | 701/45 |

FOREIGN PATENT DOCUMENTS

| | | |
|---|---|---|
| JP | 2006-103475 | 4/2006 |
| JP | 2007-055307 | 3/2007 |
| JP | 2010-111159 | 5/2010 |
| JP | 2010-111334 | 5/2010 |
| JP | 2010-120506 | 6/2010 |

OTHER PUBLICATIONS

Japanese Notice of Allowance with English Translation, dated Aug. 5, 2014, 6 pages.
International Search Report, Date of completion: Aug. 16, 2012, Date of mailing: Aug. 28, 2012.

* cited by examiner

FIG. 6

SEAT BELT DEVICE

TECHNICAL FIELD

The present invention relates to a seat belt device that restrains a passenger who sits in a seat of a vehicle using webbing. Priority is claimed on Japanese Patent Application No. 2011-182524, filed Aug. 24, 2011, the content of which is incorporated herein by reference.

BACKGROUND ART

In seat belt devices that are equipped in vehicles, webbing for restraining passengers is wound around a belt reel and the belt reel is accommodated within a retractor in a state of being biased in a webbing winding direction (there are cases below in which this is simply referred to as a winding direction) by a winding spring. Therefore, when the webbing is fastened, the webbing is drawn out against the biasing force of the winding spring, and when the webbing is released, the webbing is wound onto the belt reel by the biasing force of the winding spring.

In recent years, seat belt devices which are provided with a motor for drawing the webbing in have been developed. In these seat belt devices, the space between the belt reel and the motor is connected by a clutch, and by blocking the clutch, the seat belt devices are configured such that only the biasing force of the winding spring acts upon the webbing while the power of the motor is not being used. Further, in these seat belt devices, when the webbing is released, by switching the clutch to be in a connected state and driving the motor, the webbing is reliably wound onto the belt reel by the biasing force of the winding spring and the driving force of the motor.

Given that, in a state in which a clutch that is used in this kind of seat belt device is connected, the motor side and the belt reel side rotate integrally only in a case in which the rotational speed in the winding direction on the motor side is greater than or equal to the rotational speed on the belt reel side, and free rotation of the belt reel side is allowed due to mutual sliding of components in a case in which the rotational speed in the winding direction on the belt reel side is greater than the rotational speed on the motor side.

However, in seat belt devices that use this kind of clutch, if the clutch is put into a connected state during winding storage of the webbing, the rotational speed on the belt reel side is fast in the initial period of winding of the webbing, and the rotational speed is faster than the rotational speed on the motor side. In this kind of circumstance, it is likely that a loud abnormal noise will be generated due to the mutual sliding of the components of the clutch. Therefore, seat belt devices that have functions that handle this phenomenon have been suggested (for example, refer to Patent Document 1).

In the seat belt device that is disclosed in Patent Document 1, during winding storage of the webbing, after winding of the webbing by the winding spring starts, there is a pause until the rotational speed on the webbing side is sufficiently reduced (is less than or equal to a predetermined speed), and thereafter, driving of the motor and connection of the clutch are performed. As a result of this, in the clutch, the generation of an abnormal noise caused by the mutual sliding of the components is suppressed since the rotational speed on the belt reel side does not become greater than the rotational speed on the motor side.

CITATION LIST

Patent Document

[Patent Document 1] Japanese Unexamined Patent Application, First Publication No. 2010-111334

SUMMARY OF INVENTION

Problems to be Solved by the Invention

However, in the seat belt device that is disclosed in PTL 1, when the webbing is wound, there is a pause until the rotational speed on the belt reel side that results from the winding spring is sufficiently reduced and the motor is driven in a rotating manner. Therefore, although it is possible to suppress the generation of an abnormal noise, since it is necessary to wait for the assistance of the motor, it is difficult to cope with a desire to complete winding of the webbing quickly.

The present invention is made in the light of the above-mentioned problems, and an object of the present invention is to provide a seat belt device that is capable of winding webbing quickly while suppressing the generation of an abnormal noise.

Means for Solving the Problem

The present invention adopts the following measures in order to solve the above-mentioned problems and achieve the object thereof.

(1) A seat belt device according to an aspect of the present invention includes a belt reel around which webbing, which restrains a passenger who sits in a seat, is wound, a winding spring that rotationally biases the belt reel in a winding direction, a motor that is configured to transmit a driving force to the belt reel, and a clutch that is interposed between the motor and the belt reel, and that performs connection and disconnection between the motor and the belt reel. In a state in which the clutch is connected, the motor side and the belt reel side rotate integrally only in a case where a rotational speed in the winding direction on the motor side is greater than or equal to the rotational speed on the belt reel side, and free rotation of the belt reel side is allowed by sliding components mutually in a case in which the rotational speed in the winding direction on the belt reel side is greater than the rotational speed on the motor side. The seat belt device further includes a webbing speed detection unit that detects a winding speed of the webbing, a fastened/released state detection unit that detects a fastened state and a released state of the webbing that are due to an operation of the passenger, a basic winding control unit that drives the motor in the winding direction in a rotating manner and puts the clutch into a connected state when a result detected by the fastened/released state detection unit is switched from the fastened state to the released state, and a speed increase correction unit that increases the speed of the motor with respect to the speed of the motor that is obtained by the control of the basic winding control unit in a case in which the result detected by the fastened/released state detection unit has been switched from the fastened state to the released state and the winding speed of the webbing that is detected by the webbing speed detection unit is greater than or equal to a predetermined speed.

(2) The seat belt device according to (1) above may further include a winding length detection unit that detects the winding length of the webbing and the speed increase correction unit may increase the speed of the motor only in a period of time that is after the result detected by the fastened/released state detection unit has been switched from the fastened state to the released state until the winding length of the webbing that is detected by the winding length detection unit reaches a predetermined length.

(3) In the seat belt device according to either (1) or (2) above, the speed increase correction unit may increase the speed of the motor so that a rate of increase in the speed of the motor per unit time is less than or equal to a predetermined value.

Effects of Invention

According to the aspect (1) that is mentioned above, when the fastened/released state detection unit detects that the webbing is unfastened, the motor is driven in the winding direction in a rotating manner and the clutch is put into a connected state by the basic winding control unit. At this time, in a case in which the webbing speed that is detected by the webbing speed detection unit is greater than or equal to a predetermined speed, the speed of the motor is increased by the speed increase correction unit, and the rotational speed on the motor side rapidly approaches the rotational speed on the belt reel side. As a result of this, the motor is driven in the winding direction in a rotating manner and the clutch is put into a connected state by the basic winding control unit immediately after the webbing is unfastened by a passenger, and since, at this time, the speed of the motor is increased by the speed increase correction unit so that the rotational speed on the motor side rapidly approaches the rotational speed on the belt reel side when the webbing speed is greater than or equal to a predetermined speed, it is possible to quickly wind the webbing while suppressing the generation of an abnormal noise that results from the mutual sliding of the components of the clutch.

According to the aspect (2) that is mentioned above, the winding speed of the webbing is no longer increased in a later stage of the winding of the webbing. As a result of this, since increase in the speed of the motor by the speed increase correction unit is only performed in a period of time that is after a passenger has unfastened the webbing up until the winding length of the webbing reaches a predetermined length, it is possible for a passenger to perform alighting moving actions, for example, actions such as the passenger drawing their arm away from a webbing ring in a case of a three-point type seat belt, in a quick and efficient manner in the later stage of the winding of the webbing.

According to the aspect (3) that is mentioned above, since the increase in the speed of the motor due to the speed increase correction unit is performed so that the rate of increase in the speed of the motor per unit time is less than or equal to a predetermined value, the storage action of the webbing does not occur suddenly, and a passenger does not feel a sense of discomfort.

EMBODIMENTS OF THE INVENTION

Hereinafter, an embodiment of the invention will be described on the basis of the drawings.

Figure 1:
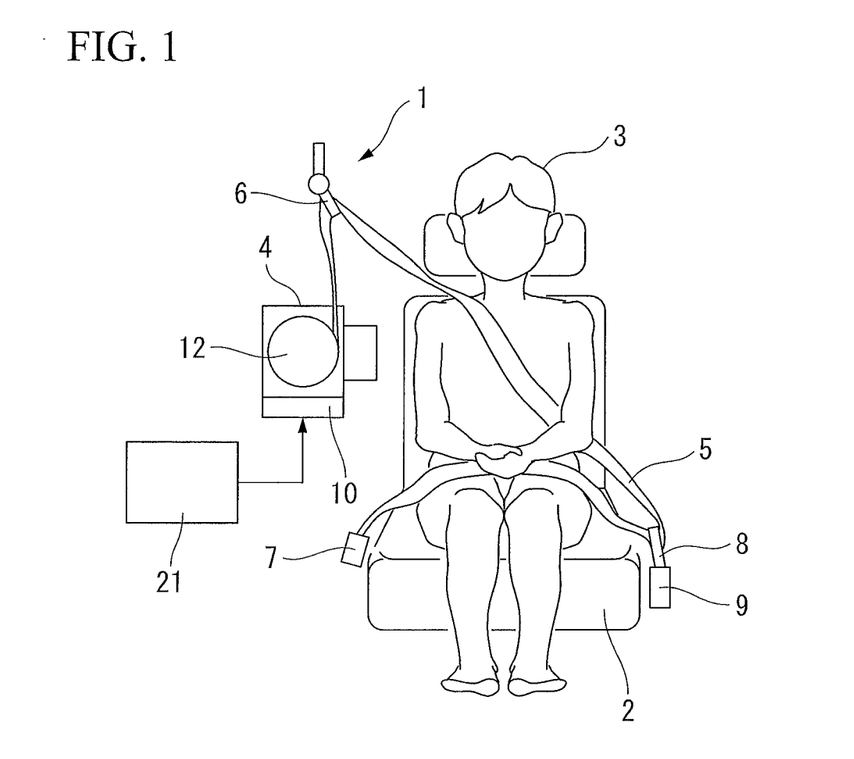
FIG. 1 is a schematic configuration drawing of a seat belt device of an embodiment of the invention.

FIG. 1 is a drawing that shows the overall outline configuration of a seat belt device 1 according to the present embodiment. Reference numeral 2 in the same drawing is a seat on which a passenger 3 sits. The seat belt device 1 according to this embodiment is a so-called three-point type seat belt device. In addition, this seat belt device 1 is configured so that webbing 5 is drawn out upwards from a retractor 4 that is attached to a center pillar (not shown in the drawing), the webbing 5 is inserted into a through anchor 6 that is supported by an upper side of the center pillar, and the end of the webbing 5 is fixed to a vehicle body floor through an outer anchor 7 that is close to the outside of the vehicle interior of the seat 2. Further, a tongue plate 8 is inserted between the through anchor 6 and the outer anchor 7 of the webbing 5, and this tongue plate 8 is released from a buckle 9 that is fixed to the vehicle body floor close to the inside of the vehicle interior of the seat 2.

The webbing 5 is wound on the retractor 4 in an initial state. The chest and abdomen of the passenger 3 are restrained in the seat 2 as a result of the passenger 3 pulling the webbing 5 with his/her hand and fixing the tongue plate 8 into the buckle 9. In addition, in this seat belt device 1, winding of the webbing 5 is performed by an electrically-operated motor 10 in an emergency, when there is a drastic change in vehicle behavior, and when the webbing 5 is wound and stored onto the retractor 4.

Figure 2:
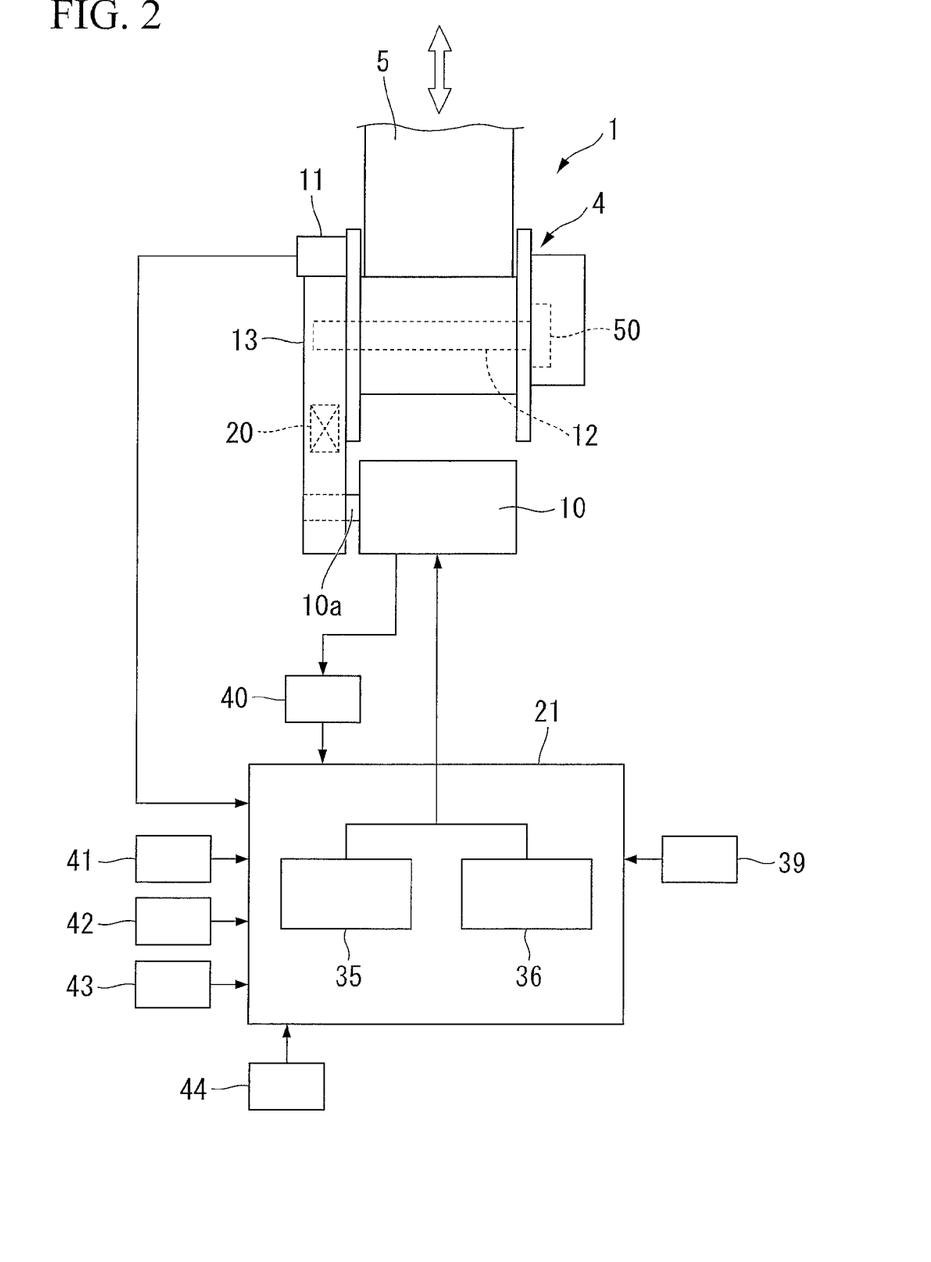
FIG. 2 is a schematic configuration drawing that is focused on a controller of the seat belt device of the same embodiment.

As shown in FIG. 2, in the retractor 4, the webbing 5 is wound around a belt reel 12 that is rotatably supported by a casing (not shown in the drawing). Furthermore, the shaft of the belt reel 12 protrudes toward one end of the casing. The shaft of the belt reel 12 is connected to a rotational shaft 10a of the motor 10 using a power transmission mechanism 13 so as to be capable of interlocking with the rotational shaft 10a. The power transmission mechanism 13 decelerates the rotation of the motor 10 and transmits the foregoing to the belt reel 12. The retractor 4 is provided with a winding spring 50 that biases the belt reel 12 in a webbing winding direction. Therefore, in a state in which the belt reel 12 and the motor 10 are isolated by a clutch 20 (to be described later), the biasing force in the webbing winding direction, which results from the winding spring 50, acts on the belt reel 12.

Furthermore, the retractor 4 is provided with a rotation sensor 11 (position detection unit) that detects the rotational position of the belt reel 12. This rotation sensor 11 is includes, for example, a magnetic circular plate in which different magnetic poles are alternately magnetized along the circumferential direction, and which rotates integrally with the belt reel 12, a pair of hole elements that are disposed in close vicinity to the peripheral portion of the magnetic circular plate, and a sensor circuit that processes a detection signal of the hole elements. In addition, pulse signals that are processed by the sensor circuit are output to a controller 21.

In this case, pulse signals that are input to the controller 21 from the sensor circuit depending on the rotation of the belt reel 12 are used to detect the amount of rotation, the rotational speed, the direction of rotation and the like of the belt reel 12. That is, the controller 21 detects the amount of rotation of the belt reel 12 (the length of the winding and drawing out of the webbing 5) by counting the pulse signals. In addition, the controller 21 obtains the rotational speed of the belt reel 12 (the speed of the winding and drawing out of the webbing 5) by calculating the rate of change (frequency) of the pulse signal. Furthermore, the controller 21 detects the direction of rotation of the belt reel 12 by comparing rises in the waveforms of both pulse signals.

In the present embodiment, the rotation sensor 11 and a portion of the functions of the controller 21 configure the webbing speed detection unit and the winding length detection unit.

Figure 3:
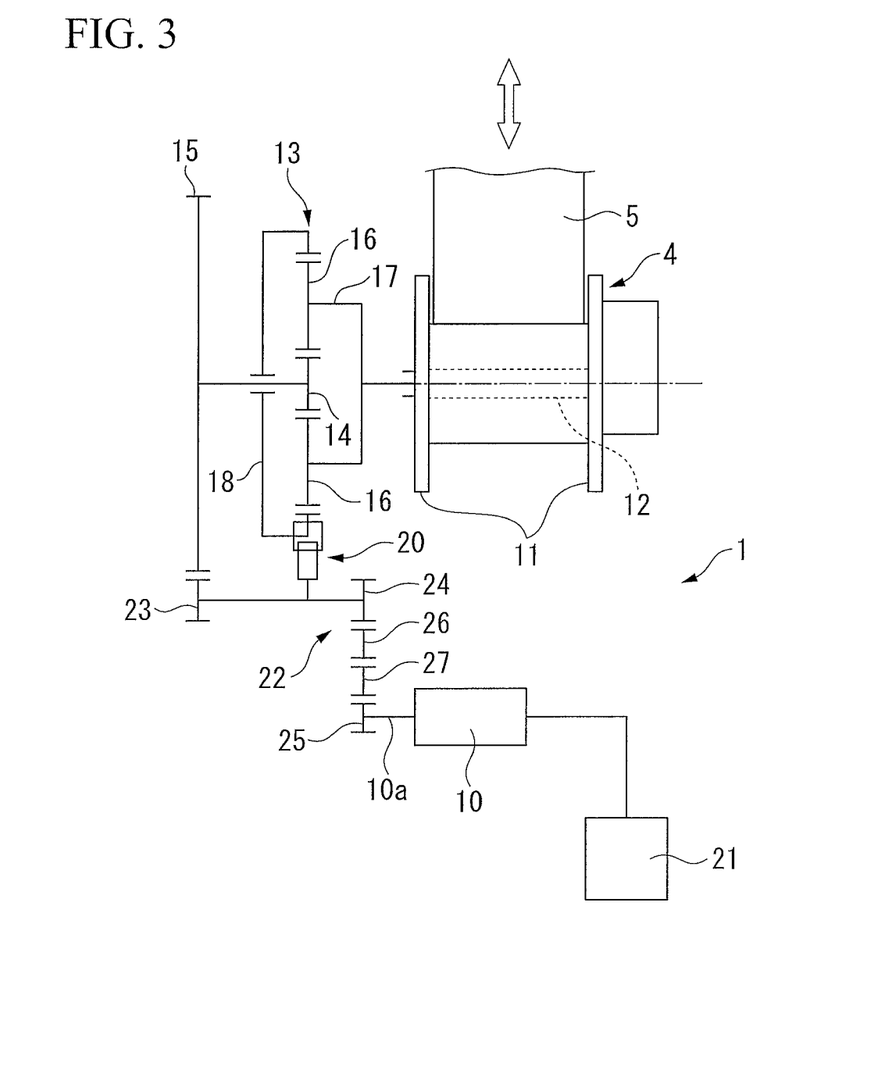
FIG. 3 is a schematic configuration drawing that is focused on a power transmission system of the seat belt device of the same embodiment.
Figure 4:
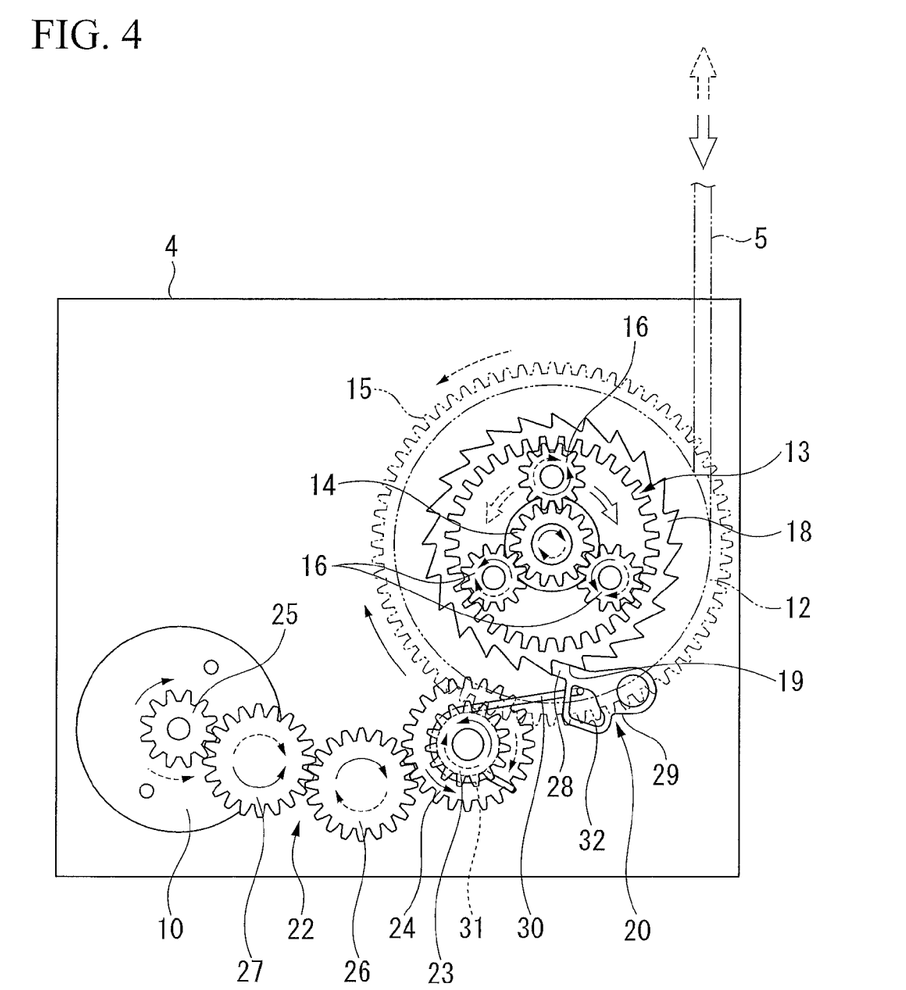
FIG. 4 is a schematic configuration drawing in which the power transmission system of the seat belt device of the same embodiment is viewed from the front.
Figure 5:
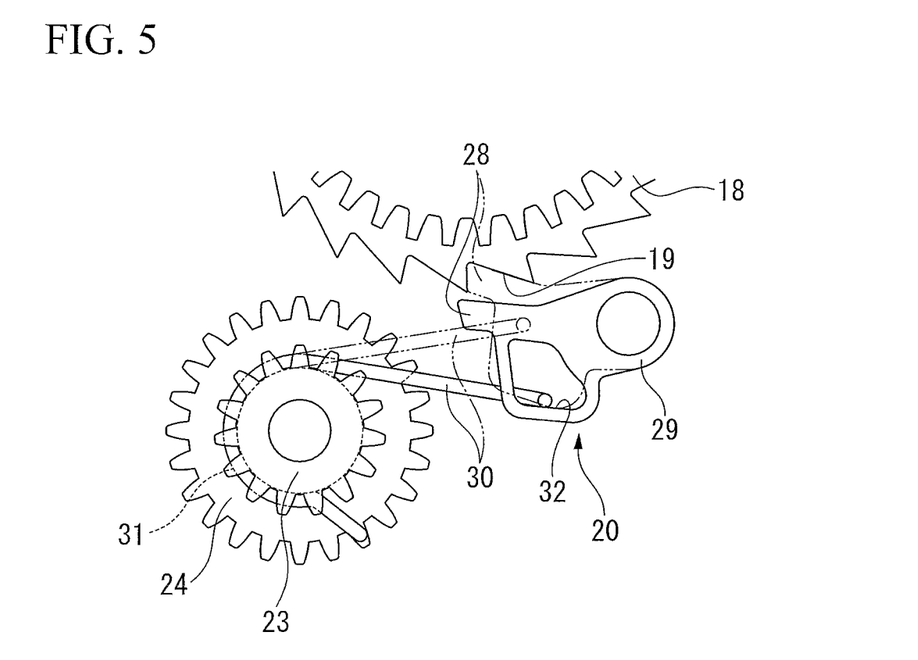
FIG. 5 is an expanded view of a portion of the power transmission system of the same embodiment.

FIGS. 3 to 5 are drawings that show the specific configuration of the power transmission mechanism 13.

In the power transmission mechanism 13, a sun gear 14 is integrally coupled with an external gear 15 for drive input, and a carrier 17 that supports a plurality of planetary gears 16 is coupled with the shaft of the belt reel 12. As shown in FIG. 4, a plurality of ratchet teeth 19 are formed on the outer periphery of a ring gear 18 that is engaged with the planetary gears 16, and these ratchet teeth 19 configure a portion of the clutch 20. The clutch 20 performs connection and disconnection of the power transmission system between the motor 10 and the belt reel 12 as appropriate as a result of the control for the driving power of the motor 10 of the controller 21.

A motor side power transmission system 22 of the power transmission mechanism 13 includes a first connect gear 23 that has a small diameter and is usually engaged with the external gear 15 that is integral with the sun gear 14, a second connect gear 24 that has a large diameter and is provided so as to be capable of rotating on the same axis as and integrally with the first connect gear 23, and a first idler gear 26 and a second idler gear 27 that are between the second connect gear 24 and a motor gear 25 (integral with the rotational shaft 10a of the motor 10) and usually engaged with the second connect gear 24 and the motor gear 25 so as to be capable of transmitting power. As shown by a solid arrow in FIG. 4, the driving power of the motor 10 in a normal rotation direction passes through each gear (the motor gear 25, the second idler gear 27 and the first idler gear 26), is transmitted to the second connect gear 24 and the first connect gear 23, and is transmitted to the belt reel 12 by the planetary gears 16 and the carrier 17 after being transmitted to the sun gear 14 by the external gear 15. The driving power of the motor 10 in the normal rotation direction causes the belt reel 12 to rotate in a direction in which the webbing 5 is drawn in. As described above, the entirety of the driving force that is transmitted to the planetary gears 16 from the sun gear 14 is transmitted to the carrier 17 side when the ring gear 18 is fixed. However, in a state in which rotation of the ring gear 18 is free, since the ring gear 18 runs idle due to autorotation of the planetary gears 16, the driving force is not transmitted to the carrier 17 side. The clutch 20 turns the transmission of the driving power of the motor with respect to the belt reel 12 (carrier 17) on and off by controlling locking and unlocking of the rotation of the ring gear 18.

Hereinafter, the clutch 20 will be described with reference to FIGS. 4 and 5. The clutch 20 is provided with a pawl 29 that is rotatably supported by the casing (not shown in the drawing) and has a latching claw 28 on the end thereof, a clutch spring 30 that operates the pawl 29, and the ratchet teeth 19 of the ring gear 18 which are capable of engaging with the latching claw 28 of the pawl 29. When the pawl 29 is operated in the direction of the ratchet teeth 19, the latching claw 28 collides with a surface that is substantially orthogonal to an inclined surface of the ratchet teeth 19 and locks rotation of the ring gear 18 in one direction.

In addition, the clutch spring 30 having a basal part that is curved in a circular arc, is latched latches onto the outer periphery of a shaft portion of the first connect gear 23 in a state that the curved portion 31 thereof is entwined with the first connect gear. The end of the clutch spring 30 extends in the pawl 29 direction, and is configured to engage with an operation window 32 of the pawl 29. The curved portion 31 of the clutch spring 30 engages with a shaft portion of the first connect gear 23 due to friction. Therefore, when torque that is greater than or equal to a certain level acts between the curved portion 31 of the clutch spring 30 and the first connect gear 23, sliding is generated between the curved portion 31 of the clutch spring 30 and the first connect gear 23 as a result of the torque.

Therefore, in the clutch 20, when the motor 10 rotates in the normal rotation direction (the direction of the solid arrow in FIG. 4), the clutch spring 30 changes from the position shown by the solid line in FIG. 5 to that shown by the dot-dash line. As a result of this, the latching claw 28 of the pawl 29 engages with the ratchet teeth 19 as shown in FIG. 4 and locks the rotation of the ring gear 18. At this time, the ratchet teeth 19 can reliably lock the rotation of the ring gear 18 in one direction, but even when the ring gear 18 is attempts to rotate in the opposite direction, an amount of force that is greater than or equal to a certain amount is required in order for the ratchet teeth 19 to push the latching claw 28 up.

When the rotation of the ring gear 18 is locked in this manner, as described above, the entirety of the rotational force that is transmitted to the sun gear 14 becomes the rotation of the carrier 17 and is transmitted to the belt reel 12. This state is a clutch on state.

On the other hand, if the motor 10 is rotated in a reverse manner from the clutch on state, the first connect gear 23 rotates in the manner shown by the dotted arrow in FIG. 4, and the clutch spring 30 is rotated in the manner shown by the solid line in FIG. 5. As a result of this, the latching claw 28 of the pawl 29 is drawn away from the ratchet teeth 19, and the locking of the ring gear 18 is released.

When the locking of the ring gear 18 is released in this manner, the rotational force that is transmitted to the sun gear 14 causes the planetary gears 16 to autorotate in the manner described above. At this time, the ring gear 18 runs idle and therefore power is not transmitted to the carrier 17 (belt reel 12) side. This state is a clutch off state.

When the clutch 20 is in the clutch on state (connected state), the behavior of the ring gear 18 differs depending on the relative rotational states of the sun gear 14 that is positioned on the motor 10 side of the planetary gear 16 and the carrier 17 that is positioned on the belt reel 12 side of the planetary gear 16 in the power transmission pathway.

That is, in a case in which the rotational speed of the sun gear 14 (motor 10 side) in the normal rotation direction is greater than or equal to the rotational speed of the carrier 17 (belt reel 12 side), the rotational torque of the sun gear 14 is applied in a direction in which the ring gear 18 is locked by the latching claw 28 of the pawl 29. At this time, a force that causes rotation in the opposite direction to the direction of rotation of the carrier 17 is applied to the ring gear 18, and the latching claw 28 engages with the ratchet teeth 19 and therefore the ring gear 18 is in a rotation stop state. On the other hand, in a case in which the rotational speed of the carrier 17 (belt reel 12 side) in the normal rotation direction is greater than the rotational speed of the sun gear 14 (motor 10 side), the rotational torque of the carrier 17 is applied in a direction in which the ring gear 18 slides with respect to the latching claw 28 of the pawl 29. At this time, the latching claw 28 of the pawl 29 slides along the inclined surface of the ratchet teeth 19 of the ring gear 18, intermittently impacts upon tooth spaces, and in a case in which the rotational speed of the ring gear 18 is high, a continuous impact noise is generated.

In the present embodiment, when the clutch 20 is in a connected state, the pawl 29 and the ring gear 18 configure components that allow free rotation of the belt reel 12 side due to mutual sliding.

On the other hand, as shown in FIG. 2, in addition to the rotation sensor 11, a buckle switch 39 (fastened/released state detection unit) that detects the engagement state of the tongue plate 8 and the buckle 9, that is, the fastened/released state of the webbing 5, and a current sensor 40 that detects a current that is conducted to the motor 10, are connected to an input side of the controller 21. Furthermore, sensors for detecting the status of a vehicle such as an anteroposterior acceleration sensor 41 that detects acceleration of the vehicle in the anteroposterior direction, a horizontal acceleration sensor 42 that detects acceleration of the vehicle in the horizontal direction, a yaw rate sensor 43 that detects angular acceleration of the vehicle in the yaw directions and a vehicle speed sensor 44 that detects the travelling speed of the vehicle, are connected to the input side of the controller 21.

When the tongue plate 8 is unfastened from the buckle 9 and a detection signal of the buckle switch 39 is switched from ON to OFF, the controller 21 drives the motor 10 in the normal rotation direction (winding direction) in a rotating manner. The controller 21 is provided with a basic winding control unit 35 that puts the clutch 20 into a connected state and a speed increase correction unit 36 that increases the speed of the motor with respect to the speed of the motor 10 that is obtained by the control of the basic winding control unit 35 in a case in which the rotational speed of the belt reel 12 (the winding speed of the webbing 5) that is calculated on the basis of a detection signal of the rotation sensor 11 is greater than or equal to a predetermined speed after the detection signal of the buckle switch 39 has been switched from ON to OFF. The basic winding control unit 35 and the speed increase correction unit 36 are measures for realizing the functions that are executed when the webbing 5 is wound and stored. The controller 21 is also provided with various function realizing measures for restraining a passenger with the webbing 5 in an emergency or when there is a drastic change in vehicle behavior, in addition to measures for realizing the functions that are executed when the webbing 5 is wound and stored, but a description thereof is omitted here.

The basic winding control unit 35 is a measure for controlling the flowing current in the motor 10 so that the motor 10 has a speed change that is set in advance when the detection signal of the buckle switch 39 is switched from ON to OFF. For example, the basic winding control unit 35 may control the current that is applied to the motor 10 so that the winding speed of the webbing 5 gradually decreases after the speed of the motor has increased to a predetermined speed. The clutch 20 is put into the connected state immediately after the initiation of driving of the motor when the motor 10 is driven in the normal rotation direction by the initiation of the control of the basic winding control unit 35.

In a case in which the clutch 20 is put into the connected state due to the initiation of the control of the basic winding control unit 35, and in this state, the rotational speed on the belt reel 12 side is greater than or equal to a predetermined speed, the speed increase correction unit 36 controls the current that is applied to the motor 10 so that the speed of the motor 10 increases. Here, the abovementioned "predetermined speed" is set to, for example, a boundary speed at which a passenger begin to feel anxious the noise that is generated by sliding of the latching claw 28 of the pawl 29 and the ratchet teeth 19.

The winding spring 50 is set to have a property in which reactive force increases with drawing out of the webbing 5. Therefore, in a state in which the webbing 5 is drawn out to a sufficient length immediately after the buckle has been released (immediately after the tongue plate 8 has been unfastened from the buckle 9), the winding speed due to the winding spring 50 is sufficiently fast, and the winding speed becomes gradually slower with the progress of the winding of the webbing 5. Therefore, when the clutch 20 is connected immediately after the release of the buckle, thereafter there is a tendency for the rotational speed on the belt reel 12 side to become faster than the rotational speed on the motor 10 side.

When the clutch 20 is connected immediately after the release of the buckle, the speed increase correction unit 36 performs speed increase correction on the motor 10 so that the rotational speed on the motor 10 side rapidly approaches the rotational speed on the belt reel 12 side. The increase in the speed of the motor 10 due to the speed increase correction unit 36 is controlled so that the rate of increase in the speed of the motor 10 per unit time is less than or equal to a predetermined value.

In the case of the present embodiment, the increase in the speed of the motor 10 due to the speed increase correction unit 36 is set so as to only be performed in a period of time that is immediately after the detection signal of the buckle switch 39 is switched from ON to OFF until the winding length of the webbing 5 reaches a predetermined length, and so as not to be performed after the winding length thereof exceeds a predetermined length. In this case, the abovementioned "predetermined length" is set to, for example, a length (approximately 400 mm in length) that is approximately a third of the length from when the buckle 9 is released until the webbing 5 is completely stored in the retractor 4.

Figure 6:
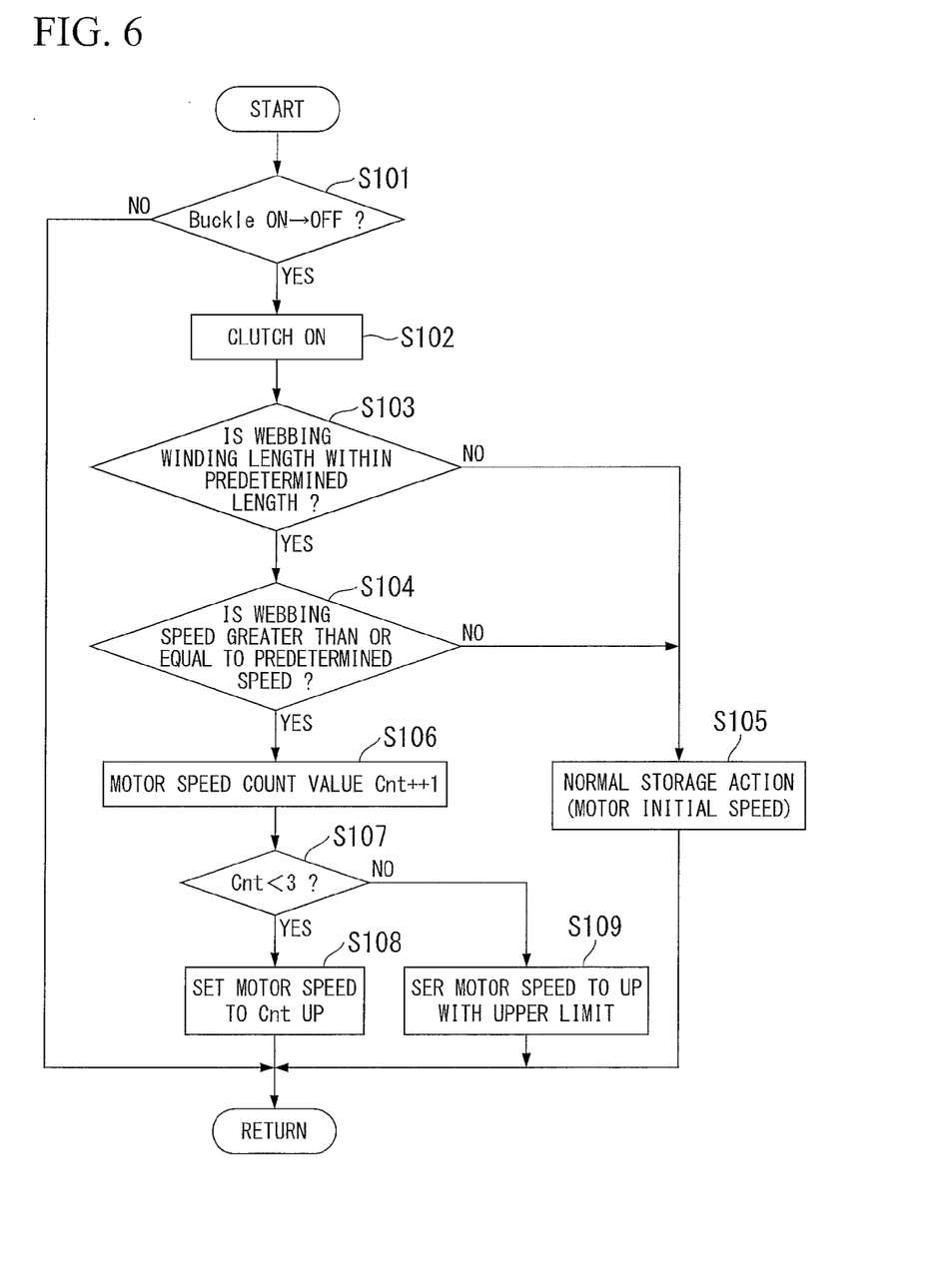
FIG. 6 is a flowchart that shows the flow of the storage control of the webbing of the seat belt device of the same embodiment.

Hereinafter, an example of the storage control of the webbing 5 according to the controller 21 of the seat belt device 1 will be described on the basis of the flowchart of FIG. 6.

In Step S101, it is determined whether or not the detection signal of the buckle switch 39 has been switched from ON to OFF. Here, in the case of Yes, the process proceeds to Step S102 and returns in the case of No.

In Step S102, the clutch 20 is put into the connected state by initiating the control of the basic winding control unit 35 and normal rotation driving of the motor 10. Additionally, the winding of the webbing 5 by the winding spring 50 begins immediately after the tongue plate 8 is unfastened from the buckle 9.

Next, in Step S103, it is determined whether or not the winding length of the webbing 5 is within a predetermined range of length. Here, in the case of Yes, the process proceeds to Step S104 and proceeds to Step S105 in the case of No. In Step S105, the control due to the basic winding control unit 35 is continued.

In Step S104, it is determined whether or not the winding speed of the webbing 5 is greater than or equal to a predetermined speed. Here, in the case of Yes, the process proceeds to Step S106, and proceeds to Step S105 and continues the control due to the basic winding control unit 35 in the case of No.

In Step S106, a motor speed count value Cnt is increased by, for example, "1", and next in Step S107, it is determined whether or not the motor speed count value Cnt is smaller than, for example, "3". Here, in the case of Yes, the process proceeds to Step S108, and proceeds to Step S109 in the case of No.

In Step S108, the motor speed count value Cnt is counted as it is and the speed of the motor 10 is increased, and in Step S109, the motor count value is limited to, for example, "2", the value (upper limit) is counted and the speed of the motor 10 is increased.

Additionally, Steps S108 and S109 are performed by the speed increase correction unit 36.

In the manner described above, in the seat belt device 1, normal rotation driving of the motor 10 is performed by the basic winding control unit 35 immediately after the tongue plate 8 is unfastened from the buckle 9, and thereafter, an increase in the motor speed is performed by the speed increase correction unit 36 when the winding length of the webbing 5 is within a predetermined range of length and the winding speed of the webbing 5 is greater than or equal to a predetermined speed. As a result of this, the rotational speed on the motor 10 side can rapidly approach the rotational speed on the belt reel 12 side. Therefore, under a circumstance in which the rotational speed on the belt reel 12 side is high immediately after the clutch 20 is connected, it is possible to wind the webbing 5 onto the belt reel 12 quickly while suppressing an abnormal noise that is generated by the sliding of the latching claw 28 of the pawl 29 on the ratchet teeth 19.

In addition, in the seat belt device 1, the increase in the speed of the motor 10 due to the speed increase correction unit 36 is set so as to only be performed in a period of time that is immediately after the tongue plate 8 is unfastened from the buckle 9 until the winding length of the webbing 5 reaches a predetermined length. Therefore, in the later stage of the winding of the webbing 5, there is no obstruction of the action of a passenger drawing their arm away from the ring of the webbing 5.

In addition, in the case of the seat belt device 1 of the present embodiment, the rate of increase in motor speed per unit time by the speed increase correction unit 36 is limited. Therefore, the storage action of the webbing 5 is prevented from occurring suddenly, and it is possible to eliminate a sense of discomfort that is felt by a passenger during storage of the webbing 5.

This invention is not limited to the abovementioned embodiment, and various design changes are possible within a range that does not depart from the scope of the invention.

INDUSTRIAL APPLICABILITY

According to the seat belt device of the present invention, since the motor is driven in a winding direction by the basic winding control unit and the clutch is put into a connected state immediately after a passenger unfastens the webbing, and the motor speed is increased by the speed increase correction unit so that the rotational speed on the motor side rapidly approaches the rotational speed on the belt reel side when the webbing speed is greater than or equal to a predetermined speed at this time, it is possible to wind the webbing quickly while suppressing an abnormal noise that is generated by mutual sliding of the components of the clutch.

BRIEF DESCRIPTION OF THE REFERENCE SYMBOLS 1 seat belt device
5 webbing
10 motor
11 rotation sensor (webbing speed detection unit and winding length detection unit)
12 belt reel
18 ring gear (complete part)
20 clutch
21 controller (webbing speed detection unit and winding length detection unit)
29 pawl (complete part)
35 basic winding control unit
36 speed increase correction unit
39 buckle switch (fastened/released state detection unit)
50 winding spring

The invention claimed is:

1. A seat belt device comprising:
a belt reel around which webbing, which restrains a passenger who sits in a seat, is wound;
a winding spring that rotationally biases the belt reel in a winding direction;
a motor that is configured to transmit a driving force to the belt reel; and
a clutch that is interposed between the motor and the belt reel, and that performs connection and disconnection between the motor and the belt reel,
wherein, in a state in which the clutch is connected, a motor side and a belt reel side rotate integrally only in a case where a rotational speed in the winding direction on the motor side is greater than or equal to the rotational speed on the belt reel side, and free rotation of the belt reel side is allowed by sliding components mutually in a case in which the rotational speed in the winding direction on the belt reel side is greater than the rotational speed on the motor side, and
wherein the seat belt device further includes a controller that includes:
a webbing speed detection unit that detects a winding speed of the webbing based on a signal received from a rotation sensor that detects a rotational position of the belt reel;
a fastened/released state detection unit that detects a fastened state and a released state of the webbing that are due to an operation of the passenger, based on a signal received from a buckle switch that detects an engagement state of a tongue plate attached to the webbing and a buckle;
a basic winding control unit that outputs a first signal to drive the motor at a first speed in the winding direction in a rotating manner and to put the clutch into a connected state when a result detected by the fastened/released state detection unit is switched from the fastened state to the released state; and
a speed increase correction unit that outputs a second signal to the motor to increase the speed of the motor from the first speed to a second speed as a result of a detection that the fastened/released state detection unit has been switched from the fastened state to the released state and the winding speed of the webbing that is detected by the webbing speed detection unit is greater than or equal to a predetermined speed.

2. The seat belt device according to claim 1, wherein the controller further comprises:
   a winding length detection unit that detects the winding length of the webbing based on the signal received from the rotation sensor,
   wherein the speed increase correction unit outputs the second signal to increase the speed of the motor only in a period of time that is between a first time point when a result detected by the fastened/released state detection unit has been switched from the fastened state to the released state and a second time point when the winding length of the webbing that is detected by the winding length detection unit reaches a predetermined length.

3. The seat belt device according to claim 2,
   wherein the speed increase correction unit outputs the second signal to increase the speed of the motor so that a rate of increase in the speed of the motor per unit time is less than or equal to a predetermined value.

4. The seat belt device according to claim 1,
   wherein the speed increase correction unit outputs the second signal to increase the speed of the motor so that a rate of increase in the speed of the motor per unit time is less than or equal to a predetermined value.

* * * * *